United States Patent [19]
Zehnpfennig

[11] 4,409,475
[45] Oct. 11, 1983

[54] SPATIAL FREQUENCY FILTER

[75] Inventor: Theodore F. Zehnpfennig, Wayland, Mass.

[73] Assignee: Visidyne, Inc., Burlington, Mass.

[21] Appl. No.: 288,155

[22] Filed: Jul. 29, 1981

[51] Int. Cl.³ ............................................. G02B 27/46
[52] U.S. Cl. .............................. 250/224; 350/162.11; 356/124.5
[58] Field of Search ................ 356/124.5; 350/162.12, 350/162.13, 162.14, 167, 484, 162.11; 250/224

[56] References Cited

U.S. PATENT DOCUMENTS

| T909,010 | 4/1973 | Kelch | 350/162.12 |
| 3,700,902 | 10/1972 | Buchan | 350/162.12 |
| 3,821,794 | 6/1974 | Yoneyama | 350/162.12 |
| 3,940,788 | 2/1976 | Abe et al. | 350/167 |
| 4,128,337 | 12/1978 | Zehnpfennig | 356/307 |

Primary Examiner—Bruce Y. Arnold
Attorney, Agent, or Firm—Joseph S. Iandiorio

[57] ABSTRACT

A spatial frequency filter including: an optical system having detector means and means for projecting onto the detector means an image of an object area; and means for operating the optical system alternately in a first mode to develop a first system transfer function and a second mode to develop a second system transfer function which is matched to the first system transfer function in low spatial frequencies and divergent therefrom in high spatial frequencies, for imposing on the detector means a first representation of the image in the first mode and a second representation of the image in the second mode, thereby providing a fluctuating elemental image output from each element of the detector means which derives from a high spatial frequency object; and also including means for limiting the wavelength range of input radiation to the detector means.

26 Claims, 25 Drawing Figures

SPATIAL FREQUENCY FILTER

FIELD OF INVENTION

This invention relates to a spatial frequency filter, and more particularly to such a filter for optically distinguishing high spatial frequency image elements from low spatial frequency image elements.

BACKGROUND OF INVENTION

It is often useful to suppress low spatial frequencies and enhance high spatial frequencies in an optical image produced by telescopes, cameras, radiometers and the like, in order to distinguish the high spatial frequency image elements from the low spatial frequency image elements. This allows the high spatial frequencies to stand out and become easier to locate, detect, and track so that point sources can be easily distinguished from a very similar background when the background is characterized by spatial frequencies which are lower than the higher frequencies of the point source.

Traditionally, the discrimination is performed electronically by massive data processing operations that require large computing capacity and a significant amount of time.

One attempt optically to preprocess images preliminarily to distinguish between objects or sources which differ from their background relates to the use of a dual beam interferometer which provides two images to a detector: a defocussed image and a sharply focussed image, whereby point sources may be detected. U.S. Pat. No. 4,128,337, Dec. 5, 1978, Method and Apparatus for Interferometric Background Suppression, Theodore F. Zehnpfennig.

It has further been suggested that techniques other than the focussing-defocussing approach may be used for discrimination purposes. In one proposal various techniques, such as introducing controlled amounts of spherical aberration, annular entrance apertures of various sizes, circular entrance apertures of various diameters, and transmittance variations, have been suggested to provide a spatial filter with two modulation transfer functions which match at lower spatial frequencies and diverge at higher spatial frequencies. To this end, pairs of optical systems were sought in which one member of the pair could be transformed into the other member and then back again with minimum mechanical disturbance to the instrument, using optical path difference variations and small oscillatory movements. It was found that one such pair could be formed by translating the central 30% portion of the primary mirror in a radiometer by one quarter wavelength to form one member, then the other member could be formed by removing the previous translation, translating the annular outer two percent of the primary mirror by one quarter wavelength, and finally oscillating the secondary mirror. See "Tailored Modulation Transfer Function and the Application to Dual Beam Interferometry", Scientific Report No. 1, Air Force Geophysics Laboratory, AFGL-TR-78-0077, Mar. 27, 1978, pages 1-29, Reference 1. Such an approach is difficult and costly to implement, and is subject to reliability and life problems because of the complexity of the mechanical and optical structures and interactions. Further, the treatment of a broad spectrum of input radiation has resulted in substantial mismatch of the various transfer functions which essentially defeats the matching at the low spatial frequencies and results in poor suppression.

SUMMARY OF INVENTION

It is therefore an object of this invention to provide an improved spatial frequency filter for optically discriminating between high and low spatial frequencies.

It is a further object of this invention to provide such a spatial frequency filter which uses simple, easily implemented motions to provide the different transfer functions.

It is a further object of this invention to provide such a spatial frequency filter which limits the input radiation wavelength.

It is a further object of this invention to provide such a spatial frequency filter which requires only two different patterns of motion to provide two transfer functions which match at low spatial frequencies and diverge at high spatial frequencies.

It is a further object of this invention to provide such a spatial frequency filter in which the regions of low spatial frequency matching and high spatial frequency divergence can be easily varied.

It is a further object of this invention to provide such a spatial frequency system which may be implemented with a single optical system driven in two different modes by a simple actuator to obtain two different motions and resulting transfer functions.

The invention results from the realization that a simple yet extremely effective optical spatial frequency filter can be made for preliminarily discriminating higher spatial frequencies from lower spatial frequencies by limiting the wavelength of incoming radiation and also by operating the optical system alternately in one mode and then another to provide two different transfer functions which suppress the low spatial frequency elements of the image and cause the high spatial frequency elements to fluctuate for easy detection.

This invention features a spatial frequency filter including an optical system having detector means and means for projecting onto the detector means an image of an object area. There are means for operating the optical system alternately at least in the first mode to develop a first system transfer function and a second mode to develop a second transfer system function, which is matched to the first system transfer function in low spatial frequencies and divergent therefrom in high spatial frequencies. This imposes on the detector means a first representation of the image in the first mode and a second representation of the image in the second mode in order to produce a fluctuating elemental image output from each element of the detector means which derives from a high spatial frequency object. Means are provided for limiting the wavelength of input radiation to the detector means.

The invention also features a spatial frequency filter having an optical system including detector means and means for projecting onto the detector means an image of an object area. There are means for gyrating the optical system alternately at least in a first mode to develop a first system transfer function and a second mode to develop a second system transfer function which is matched to the first system transfer function in low spatial frequencies and divergent therefrom in high spatial frequencies.

In a preferred embodiment, the means for operating or the means for gyrating may move the means for projecting relative to the detector means, or may move the detector means relative to the projecting means. Or an optical element disposed in the optical path between the means for projecting and the detector means may be moved or gyrated by the means for operating or gyrating. There may be further included means for sensing fluctuations of the output of the detector means, and the means for sensing may include means for subtracting the image in one mode from the image in the other mode. The means for sensing may include a band pass filter and an AC coupling means interconnecting the band pass filter and the detector means, and the band pass filter may be tuned to the frequency of the alternation of the first and second modes. The means for operating or the means for gyrating may include piezoelectric means and may further include means for driving the optical system to move or gyrate at one or more radii for a first period of time in the first mode and to gyrate at one or more other radii for a second period of time in the second mode. At least one of the modes may include intermittent dwell periods.

DISCLOSURE OF PREFERRED EMBODIMENT

Other objects, features and advantages will occur from the following description of a preferred embodiment and the accompanying drawings, in which.

Point sources contain all spatial frequencies and are distinguished from most other sources by the fact that those other sources have the lower spatial frequencies but do not have the higher spatial frequencies. Thus a system which can discriminate higher spatial frequencies from lower spatial frequencies will serve well to identify point sources in the presence of structured backgrounds. The spatial frequency filter according to this invention is such a device.

Figure 1:
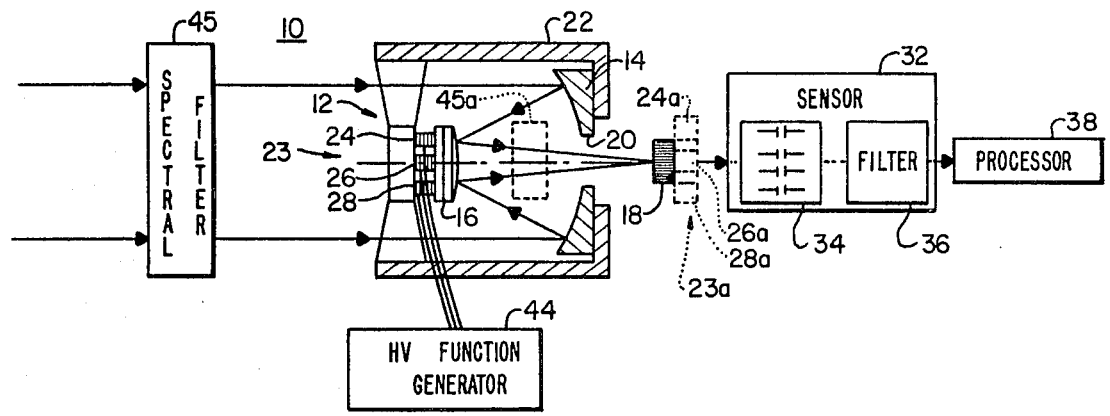
FIG. 1 is a diagrammatic cross-sectional view of a spatial frequency filter according to this invention, including sensor means, a device for subsequent processing of the data, and a high voltage function generator for driving the means for gyrating.
Figure 2A:
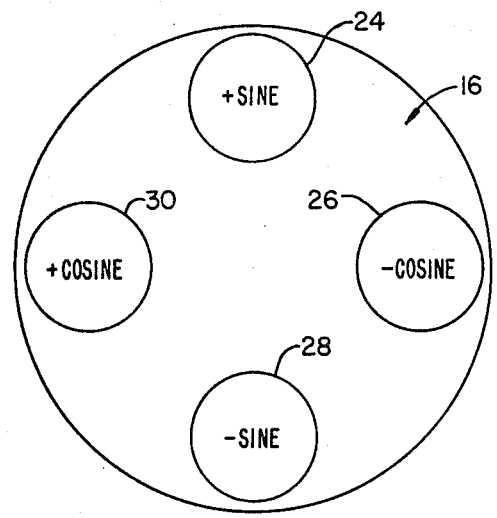
FIG. 2A is a diagrammatic plan view of the means for gyrating of FIG. 1.

There is shown in FIG. 1 a spatial frequency filter 10 according to this invention having an optical system 12 including some means for projecting such as a primary optical element, concave perforated mirror 14, and a convex secondary mirror 16, and a detector array viewing mirror 16 through perforation 20 in mirror 14. Optical system 12 may be located in a telescope or radiometer structure 22 and mirror 16 and mirror 14 may in fact constitute the Cassegrain system of such a radiometer. Image radiation directed at this radiometer 22 strikes mirror 14 and is reflected to convex mirror 16 and then focussed on the sensitive surface of detector 18. In accordance with this invention, the optical system is gyrated, for example in FIG. 1, by gyrating mirror 16 by some means 23 such as piezoelectric actuators 24, 26, 28 and 30, shown more distinctly in plan view in FIG. 2A, which are driven by high voltage function generator 44, FIG. 1. Some means for limiting the wavelength range of input radiation to detector 18, such as spectral bandpass filter 45, is also included. It may be placed anywhere in the optical path, e.g. between mirror 14 and mirror 16 or between mirror 16 and detector 18, as indicated at 45a. This prevents wavelengths outside the region of interest from entering the system and degenerating the low spatial frequency match of the transfer functions which accomplish the low spatial frequency suppression.

In operation, mirror 16 is gyrated first in one mode and then in a second mode alternately by actuators 24-30, resulting in first and second representations of the image being projected onto the face of detector 18. The two gyration modes performed by mirror 16 suppress low spatial frequency image elements and enhance high spatial frequency image elements so that the high spatial frequency image elements fluctuate on detector array 18 at the same rate or frequency at which the two modes are alternately interchanged. The fluctuating elements may be detected by sensor 32, which may include an AC coupling unit 34, such as a set of capacitors, and a temporal or electronic filter 36 which passes fluctuations in a band centered on the frequency of the alternating interchange of the two modes and blocks other frequencies. The output from sensor 32, having been suitably preliminarily processed to provide only the information from the fluctuating high spatial frequency elements of the image, is then directed to a data processor 38 which need only then process these higher spatial frequency image elements. The detector array may be a one or two dimensional array of lead sulfide, indium antiminide, or mercury cadmium telluride detector elements. Sensor 32 may be any suitable means by which the fluctuating signals to be detected, for example the output from the detector elements may be fed to an A to D converter so that the outputs from successive modes can be subtracted or algebraically combined to obtain the difference between the images produced in the two modes.

Figure 2B:
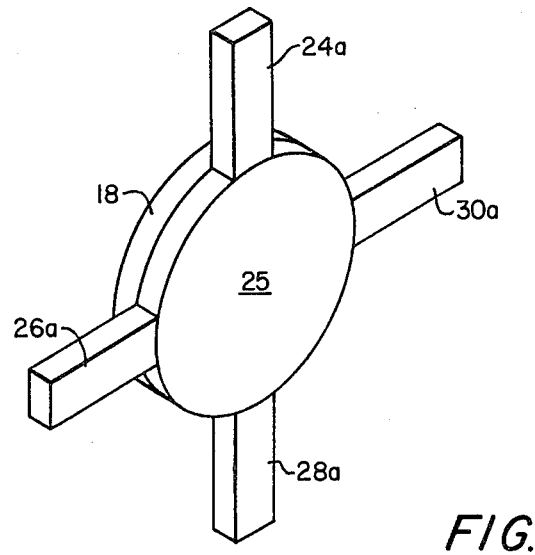
FIG. 2B is an enlarged axonometric view of an alternative arrangement for translating the detector means of FIG. 1.

Alternatively, the means for gyrating 23 may be mounted to detector 18: piezoelectric actuators 24a, 26a, 28a, and 30a (not visible) in FIG. 1. The arrangement of actuators 24a, 26a, 28a and 30a mounted to base plate 25 of detector 18 is shown in greater detail in FIG. 2B. In another implementation, the means for gyrating 23b, FIG. 3, may be used to drive an intermediate optical element such as mirror 40 disposed in the optical path between detector 18 and mirror 16. Gyrating means 23b is fixed to a suitable mounting 42. Although in FIGS. 1 and 3 a single optical element is used to provide both modes, this is not a necessary limitation of the invention, as two different optical elements may be used, one to provide each mode.

Figure 4:
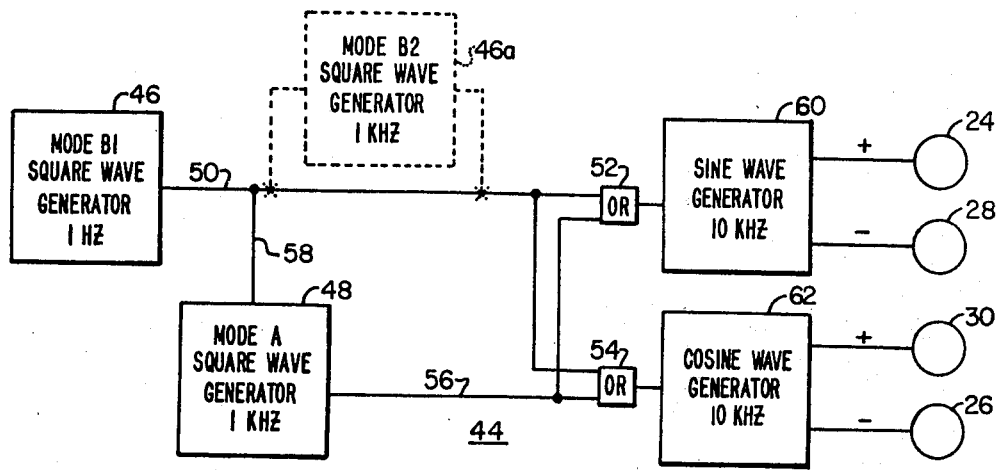
FIG. 4 is a block diagram of the high-voltage function generator of FIG. 1.

In one embodiment, high voltage function generator 44, FIG. 4, may include a mode B1 square wave generator 46 which operates at one Hz and a mode A square wave generator 48 which operates at one KHz. The output of generator 46 is provided on line 50 directly to OR gates 52 and 54 and the output of generator 48 is delivered directly to the same OR gates over line 56. The output of generator 46 is also provided over line 58 to the controlled input of generator 48. OR gates 52 and 54 control sine wave generator 60 and cosine wave generator 62, which operate at 10 KHz and whose outputs drive piezoelectric actuators 24-30. Actuator 24 is driven by a plus sine wave, actuator 26 by a minus cosine wave, actuator 28 by a minus sine wave and actuator 30 by a plus cosine wave. During the first part of the cycle of square wave generator 46, when the output on line 50 is at zero, the mode A square wave generator 48 is enabled to provide a 1 KHz square wave on line 56 to OR gates 52 and 54 to drive generators 60 and 62 to provide their respective sine and cosine outputs at 5,000 volts maximum amplitude. During the second half of the cycle, when mode B1 square wave generator 46 provides a positive output on line 50, mode A square wave generator 48 is disabled and the positive output from generator 46 is provided through OR gates 52 and 54 directly to generators 60 and 62 to provide 3,000 volt maximum sine and cosine output. More specifically, in mode B1, the output waveforms of 60 are (in volts) equal to +3,000 sin (2π10,000t) and −3000 sin (2π10,000t), where t is time. Those of 62 are +3000 cos (2π10,000t) and −3000 cos (2π10,000t).

Figure 5:
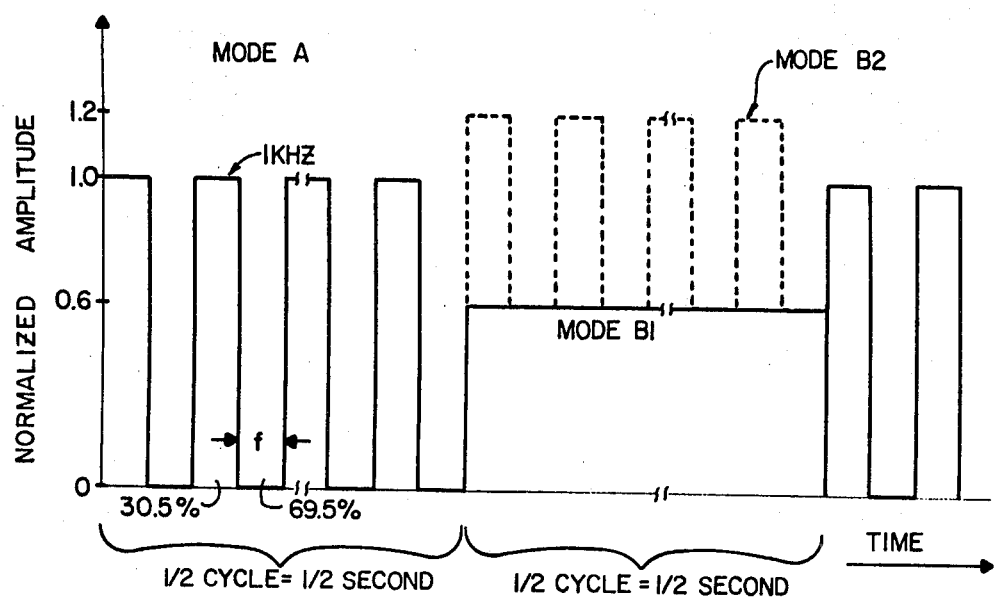
FIG. 5 is an illustration of the waveforms generated by the circuit of FIG. 4 to drive the means for actuating of FIG. 1.

The form of the wave shape may best be seen in FIG. 5. During the first half cycle, which at 1 Hz is equivalent to one half second during mode A, the 1 KHz signal from generator 48 provides a fractional gyration time of typically 30.5% and a fractional dwell time f equal to 69.5%. During the next half of the cycle or the next half second, when generator 46 output goes positive in mode B1, a constant output is provided to 60 and 62 for the entire half cycle, giving a constant gyration radius of $R_{B1}$.

Figure 3:
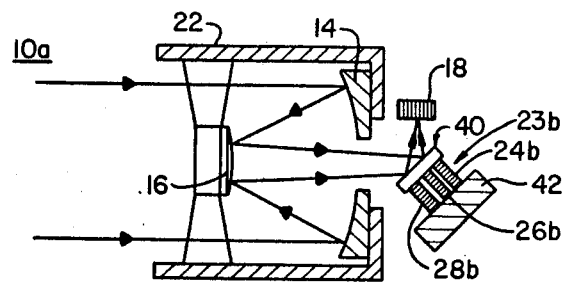
FIG. 3 is a view similar to FIG. 1 showing an alternative configuration with a different location of the means for gyrating.
Figure 6:
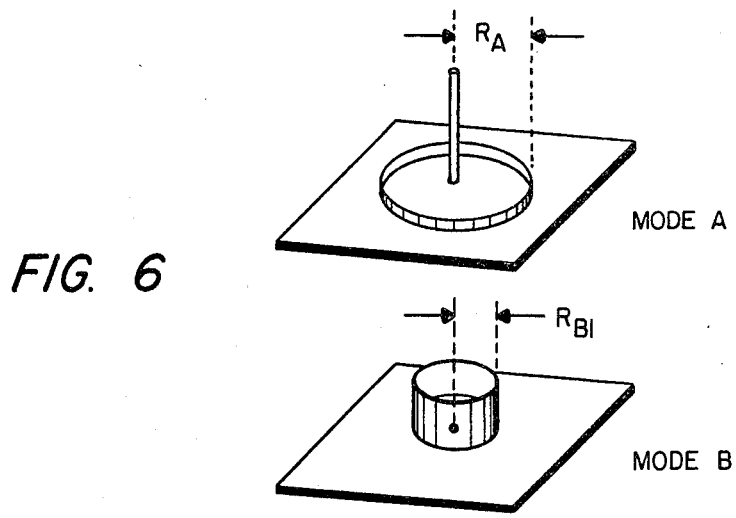
FIG. 6 illustrates a pattern of gyrations in each mode.
Figure 10:
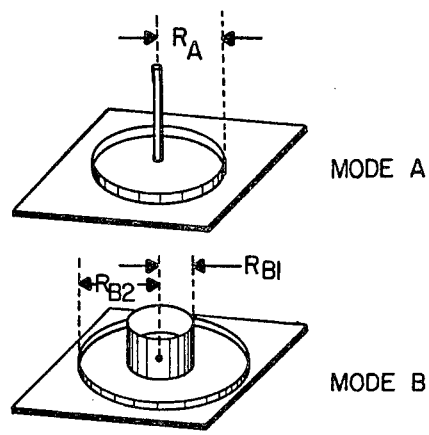
FIG. 10 illustrates a pattern of gyrations similar to that of FIG. 6 with a modified pattern of gyrations in mode B.

The gyration patterns provided by the optical system of FIG. 1 driven by the circuits of FIG. 4 as explained with reference to the wave forms of FIG. 5 may include a circular gyration represented by the relatively low amplitude cylindrical form having a radius in the detector plane of $R_A$, FIG. 6, in mode A, and in mode B1 may include a gyration represented by the cylindrical form of larger amplitude and smaller radius $R_{B1}$. Although the gyration patterns in FIG. 6 and in FIG. 10 are illustrated as cylinders, this is for purposes of illustration only: the actual diffraction pattern appears as shown in FIG. 3 of Reference 2, cited infra. The central spike shown in mode A, FIG. 6, represents the intermittent, non-gyrated dwell periods in mode A. The cylindrical illustrations are abstractions illustrating the radius and relative duration spent at each gyration radius. Other than circular patterns may be utilized. For example, one or both of the patterns could be spiral so that the gyration pattern begins at the external radius and spirals inwardly to the central axis in one mode and then begins at the central axis and spirals outwardly in the other mode. Such a system should reduce accelerations, While typically there are two modes of gyration, this is not necessary as there may be more than two with various dwell periods as well.

Figure 7:
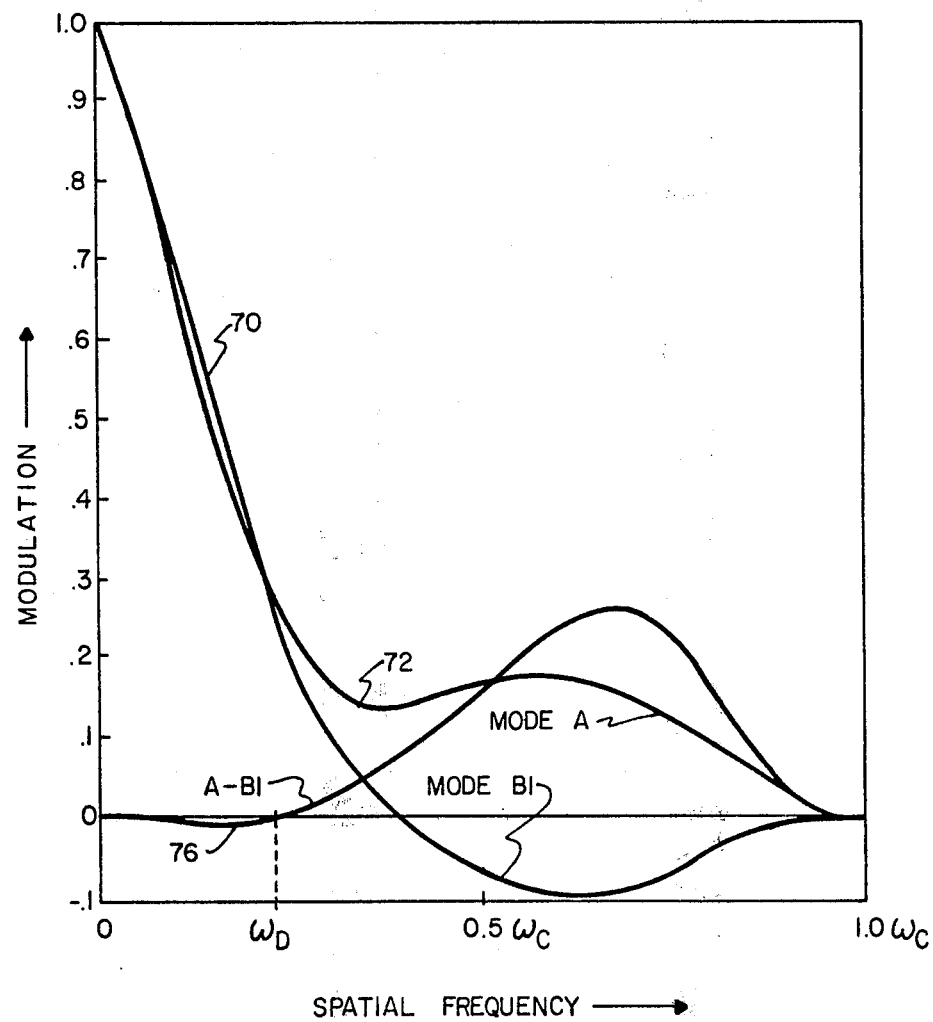
FIG. 7 illustrates the modulation transfer functions for each mode and the difference between them.

The means for projecting, optical system 12, has a modulation transfer function in one mode as indicated by the curve labelled "Mode A" in FIG. 7, and in the other mode as indicated by the curve labelled "Mode B1" in FIG. 7. These curves are matched in the regions of low spatial frequency 70 and diverge in the regions of high spatial frequency 72. In fact, the curve from mode B1 goes negative at high spatial frequencies while the curve from mode A stays positive. Thus the image areas containing spatial frequencies in the upper or higher region will fluctuate as they are successively interchanged on the detector face and cause fluctuations in the detector array elements receiving image elements derived from objects or sources of high spatial frequency. In comparison, in the lower spatial frequency region 70 the two curves mode A and mode B1 in FIG. 7 are matched and so there will be no fluctuation noticed in the lower spatial frequency regions. The combined modulation transfer function of spatial frequency filter 10 is indicated as curve A-B1 in FIG. 7, which has an effectively zero response in the lower regions and high response in the higher regions. The transition between the low spatial frequency region and the high spatial frequency region is the null point at which the spatial frequencies of the two modes are the same.

The desired value for the null point $\omega_D$ is chosen by selecting the radii $R_A$, $R_{B1}$, and the fractional dwell time f in accordance with the expression:

$$J_0(2\pi R_{B1}\omega_D) = f + (1-f)J_0(2\pi R_A \omega_D) \tag{1}$$

where $J_0$ is the zero order Bessel function, f is the fraction of time spent dwelling without gyrations while in mode A, $R_A$ is the radius of mode A gyration, $R_{B1}$ is the radius of mode B gyration, and $\omega_D$ is the spatial frequency of the null point at which the two transfer functions match. With $R_A$ equal to 1.615, $R_{B1}$ equal to 0.808, and f equal to 0.695, $\omega_D$ occurs at 0.20. The units of $R_A$ and $R_{B1}$ are $\lambda/d$, where $\lambda$ is the wavelength of the center of the spectral passband and d is the diameter of the entrance aperture of the optics. The center wavelength of the spectral filter 45, FIG. 1, covers a broad enough band to include targets of interest and a narrow enough band to keep the low spatial frequency portion of the modulation transfer functions sufficiently matched to produce the desired low spatial frequency suppression. A further explanation of the background and details of implementation of the invention is contained in "Background Suppression With Variable Modulation Transfer Function Imaging Systems", Zehnpfennig et al., SPIE Vol. 253, pp. 8–14, Reference 2, which is incorporated herein by reference.

It is normally desirable to have $\omega_D$ at somewhere between 20% and 50% of the cutoff frequency, but this can vary depending upon the spatial frequency of the objects desired to be identified. The cutoff frequency $\omega_c$, measured in the image plane of a diffraction limited optical system, is equal to the diameter of the aperture divided by the product of the focal length and the wavelength of the radiation.

Figure 9:
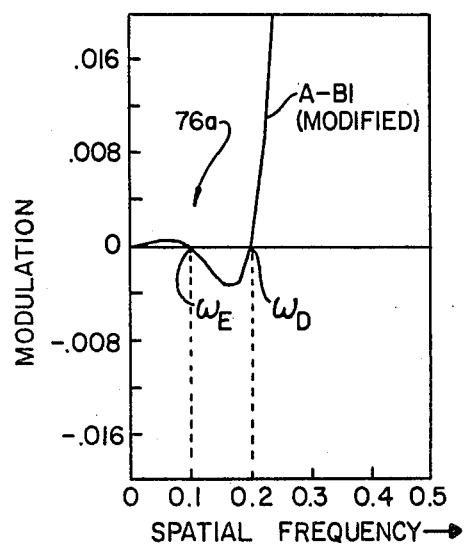
FIG. 9 is an enlarged portion of the low spatial frequency region of the modulation transfer of FIG. 8.
Figure 8:
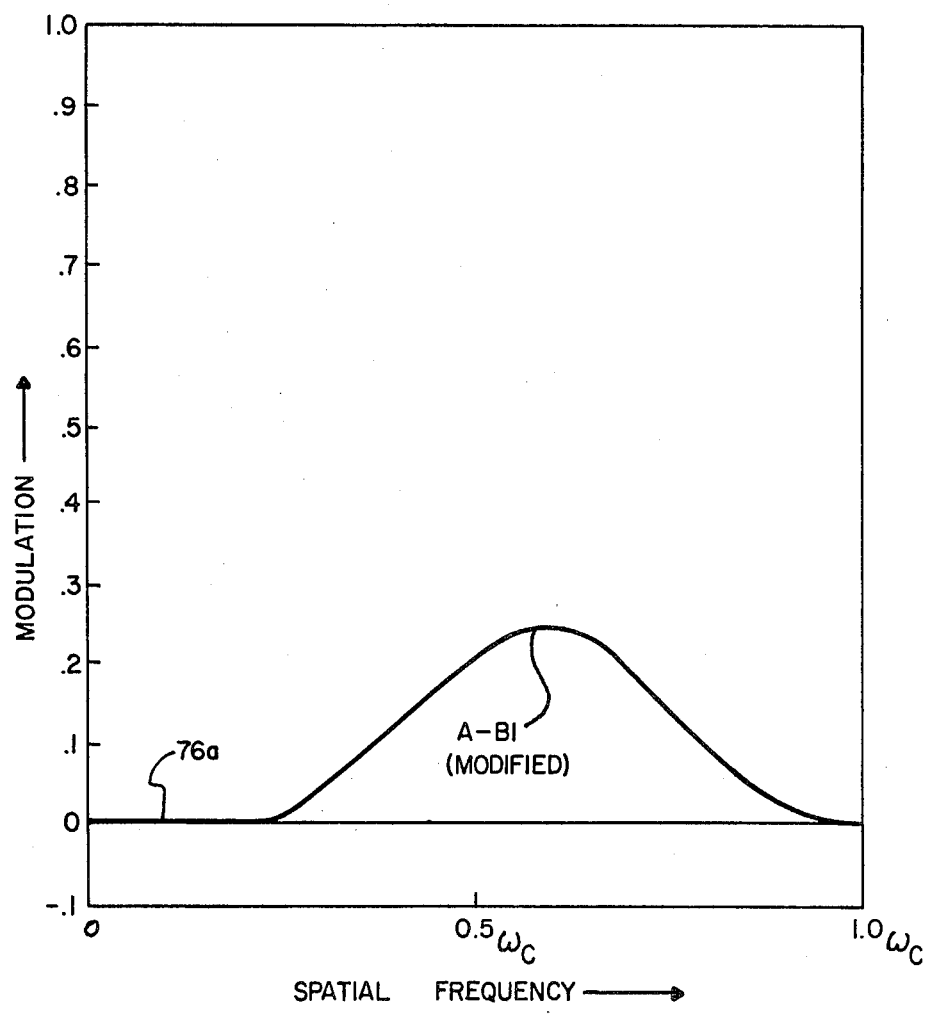
FIG. 8 illustrates a modified modulation transfer function consisting of the difference between the modulation transfer functions of modes A and B.

In FIG. 7, while the modulation transfer functions have a workable match, that match is not precise. For example, see the slight negative excursion of curve A-B1 in region 76, FIG. 7. A more precise match indicated in region 76a, FIG. 8, of the modified A-B1 modulation transfer function can be obtained by having that transfer function cross the zero level twice, as indicated in FIG. 9, where the area 76a has been enlarged to show that in addition to the axis crossing at $\omega_D$ there is a previous crossing at $\omega_E$. Again, these spatial frequencies $\omega_E$ and $\omega_D$ may be chosen by selection of g and $R_{B2}$ as well as $R_A$, $R_{B1}$ and f, previously referred to with respect to expression (1), through the simultaneous solution of equations (2) and (3):

$$gJ_0(2\pi R_{B1}\omega_D)+(1-g)J_0(2\pi R_{B2}\omega_D)=f+(1-f)J_0(-2\pi R_A\omega_D) \quad (2)$$

$$gJ_0(2\pi R_{B1}\omega_E)+(1-g)J_0(2\pi R_{B-}2\omega_E)=f+(1-f)J_0(2\pi R_A\omega_E) \quad (3)$$

where $R_{B2}$ is the radius of a second gyration pattern in mode B, and g is the fraction of the time when in mode B which is spent gyrating at radius $R_{B1}$.

The resulting gyration patterns are shown in FIG. 10, where the general form of mode A is unchanged from mode A of FIG. 6, but mode B includes now, in addition to the smaller-radius $R_{B1}$ pattern, a second pattern of larger radius $R_{B2}$. This second gyration pattern in mode B may be derived by superimposing a second set of square waves indicated in dashed line in FIG. 5 as mode B2 on the existing signal wave form mode B1. This may be done simply by adding an additional mode B2 square wave generator at 1 KHz 46a in line 50, FIG. 4. Thus the filter of this invention is easily tuned to a particular range of high spatial frequencies versus low spatial frequencies and may be modified to improve the match in the low frequency regions as required by circumstances.

Figure 11:
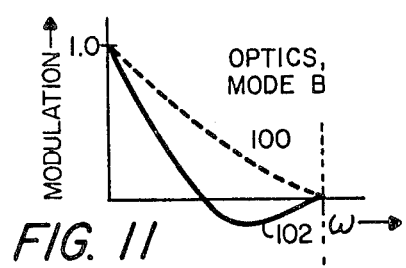
FIGS. 11–17 illustrate the various transfer functions generated when an optical portion of the spatial filter is gyrated.
Figure 12:
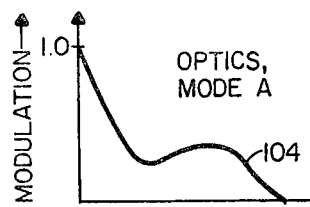
Figure 13:
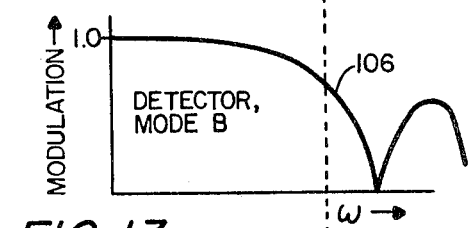
Figure 14:
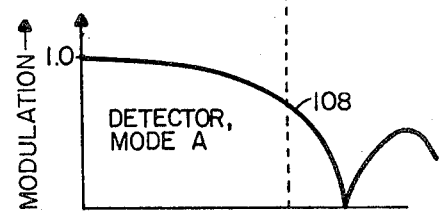
Figure 15:
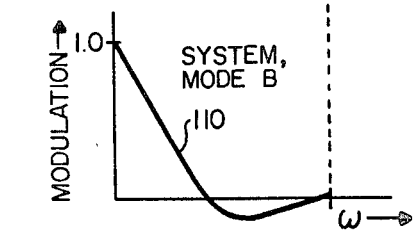
Figure 16:
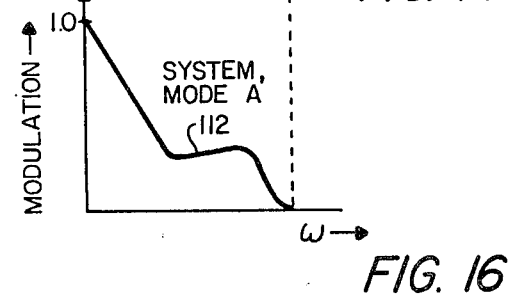
Figure 17:
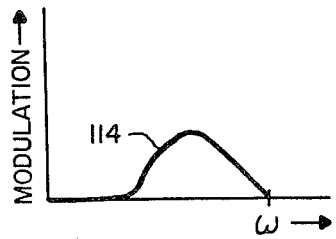

Thus far we have taken the ungyrated modulation transfer function 100, FIG. 11, of the optic elements and gyrated it in mode B to provide the modulation transfer function 102, and have further gyrated the optical elements in mode A to obtain modulation transfer function 104, FIG. 12. The transfer function 106, FIG. 13, of the detector array in mode B is identical to the transfer function 108, FIG. 14, of the detector array in mode A. This results in a system transfer function 110, FIG. 15, in mode B, derived from the product of transfer functions 102 and 106. In mode A there results the transfer function 112, FIG. 16, from the product of transfer functions 104 and 108. The combination, by subtraction of the two transfer functions 110 and 112, then results in the system transfer function 114, FIG. 17.

Figure 18:
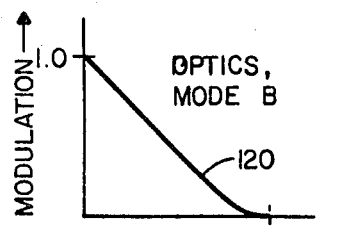
FIGS. 18–24 illustrate the various transfer functions generated when the detector portion of the spatial filter is gyrated.
Figure 19:
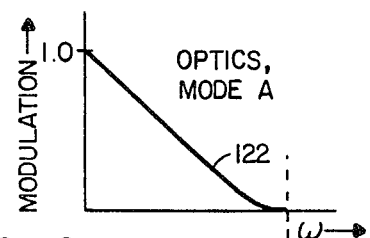
Figure 20:
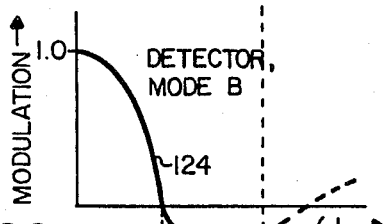
Figure 21:
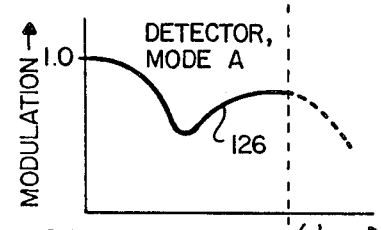
Figure 22:
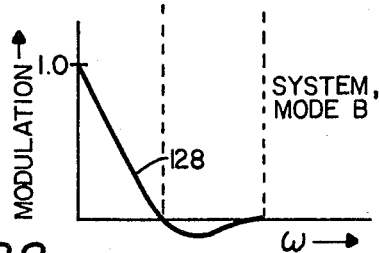
Figure 23:
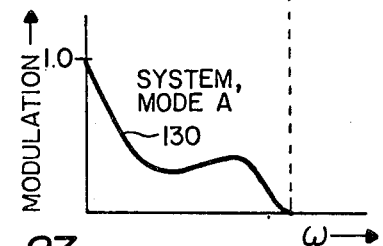
Figure 24:
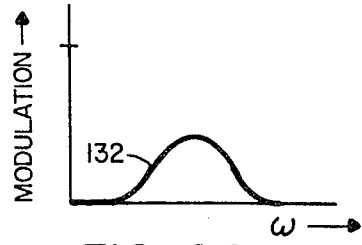

However, the invention is not restricted to the gyration of the optical elements. The detector elements may also be gyrated according to the invention. In that case the transfer function 120, FIG. 18, of the optics in mode B is identical to the transfer function 122, FIG. 19, of the optics in mode A. However, with the detector gyrated the detector's transfer function 124, FIG. 20, in mode B, takes a different form than the detector's transfer function 126, FIG. 21, in mode A. The product of transfer functions 120 and 124 result in transfer function 128, FIG. 22, for mode B, and the product of transfer functions 122 and 126 result in the transfer function 130, FIG. 23, for mode A. The resulting system transfer function 132, FIG. 24, is the same as the system transfer function 114 in FIG. 17; any part of the optical system, either the detector array or one or more of the optical elements, may be gyrated to accomplish the same result.

Although the embodiments disclosed herein relate to two-dimensional gyrations, this is not a necessary limitation of the invention. For example, a one-dimensional or linear motion can be effected using only one of the sine or cosine generators in FIG. 4. In that case the motion pattern would be represented as a line or lines instead of a circle or circles as illustrated in FIGS. 6 and 10.

Other embodiments will occur to those skilled in the art and are within the following claims:

What is claimed is:

1. A spatial frequency filter comprising:
an optical system having detector means and means for projecting onto said detector means an image of an object area; and
means for gyrating said optical system alternately at least in a first mode to develop a first system transfer function and a second mode to develop a second system transfer function which is matched to said first system transfer function in low spatial frequencies for imposing on said detector means a first representation of the image in said first mode and a second representation of the image in said second mode for providing a fluctuating elemental image output from each element of said detector means, which image output derives from a high spatial frequency object.

2. The spatial frequency filter of claim 1 in which said means for gyrating said means for projecting relative to said detector means.

3. The spatial frequency filter of claim 1 further including means for sensing fluctuations of the output of said detector means.

4. The spatial frequency filter of claim 3 in which said means for sensing includes means for subtracting the image in one mode from that in the other mode.

5. The spatial frequency filter of claim 3 in which said means for sensing includes a bandpass filter and a.c. coupling means interconnecting said bandpass filter and said detector means.

6. The spatial frequency filter of claim 5 in which said means for sensing includes a bandpass filter and wherein said bandpass filter is tuned to the temporal frequency of the alternation of said first and second modes.

7. The spatial frequency filter of claim 1 in which said optical system further includes an optical element in the optical path between said means for projecting and said detector means and said optical element is gyrated by said means for gyrating.

8. The spatial frequency filter of claim 1 in which said detector means is gyrated by said means for gyrating.

9. The spatial frequency filter of claim 1 in which said means for gyrating includes piezoelectric means.

10. The spatial frequency filter of claim 1 in which said means for gyrating includes means for driving said optical system to gyrate at at least a first radius for a first period of time in said first mode and to gyrate at at least a second radius for a second period of time in said second mode.

11. The spatial frequency filter of claim 1 in which at least one of said modes includes intermittent dwell periods.

12. A spatial frequency filter comprising:
an optical system including detector means and means for projecting onto said detector means an image of an object area; and
means for gyrating said means for projecting relative to said detector means alternatively at least in a first mode to develop a first modulation transfer function and a second mode to develop a second modulation transfer function which is matched to said first modulation transfer function in low spatial frequencies for imposing on said detector means a first representation of the image in said first mode and a second representation of the image in said second mode for providing a fluctuating elemental image output from each element of said detector means which derives from a high spatial frequency object.

13. A spatial frequency filter comprising:

an optical system including detector means and means for projecting onto said detector means an image of an object area;

means for gyrating said means for projecting relative to said detector means alternatively at least in a first mode to develop a first modulation transfer function and a second mode to develop a second modulation transfer function which is matched to said first modulation transfer function in low spatial frequencies for imposing on said detector means a first representation of the image in said first mode and a second representation of the image in said second mode for providing a fluctuating elemental image output from each element of said detector means, which image output derives from a high spatial frequency object; and means for sensing fluctuations of the output of said detector means.

14. A spatial frequency filter comprising:

an optical system having detector means and means for projecting onto said detector means an image of an object area;

means for operating said optical system alternately at least in a first mode to develop a first system transfer function and a second mode to develop a second system transfer function which is matched to said first system transfer function in low spatial frequencies for imposing on said detector means a first representation of the image in said first mode and a second representation of the image in said second mode for providing a fluctuating elemental image output from each element of said detector means, which image output derives from a high spatial frequency object; and means for limiting the wavelength of input radiation to said detector means.

15. The spatial frequency filter of claim 14 in which said means for operating moves said means for projecting relative to said detector means.

16. The spatial frequency filter of claim 14 further including means for sensing fluctuations of the output of said detector means.

17. The spatial frequency filter of claim 16 in which said means for sensing includes means for subtracting the image in one mode from that in the other mode.

18. The spatial frequency filter of claim 16 in which said means for sensing includes a bandpass filter and a.c. coupling means interconnecting said bandpass filter and said detector means.

19. The spatial frequency filter of claim 18 in which said means for sensing includes a bandpass filter and said bandpass filter is tuned to the temporal frequency of the alternation of said first and second modes.

20. The spatial frequency filter of claim 14 in which said optical system further includes an optical element in the optical path between said means for projecting and said detector means and said optical element is moved by said means for operating.

21. The spatial frequency filter of claim 14 in which said detector means is moved by said means for operating.

22. The spatial frequency filter of claim 14 in which said means for operating includes piezoelectric means.

23. The spatial frequency filter of claim 14 in which said means for operating includes means for driving said optical system to gyrate at at least a first radius for a first period of time in said first mode and to gyrate at at least a second radius for a second period of time in said second mode.

24. The spatial frequency filter of claim 14 in which at least one of said modes includes intermittent dwell periods.

25. A spatial frequency filter comprising:

an optical system including detector means and means for projecting onto said detector means an image of an object area;

means for moving said means for projecting relative to said detector means alternatively at least in a first mode to develop a first modulation transfer function and a second mode to develop a second modulation transfer function which is matched to said first modulation transfer function in low spatial frequencies for imposing on said detector means a first representation of the image in said first mode and a second representation of the image in said second mode for providing a fluctuating elemental image output from each element of said detector means, which image output derives from a high spatial frequency object; and means for limiting the wavelength of input radiation to said detector means.

26. A spatial frequency filter comprising:

an optical system including detector means and means for projecting onto said detector means an image of an object area;

means for moving said means for projecting relative to said detector means alternatively at least in a first mode to develop a first modulation transfer function and a second mode to develop a second modulation transfer function which is matched to said first modulation transfer function in low spatial frequencies for imposing on said detector means a first representation of the image in said first mode and a second representation of the image in said second mode for providing a fluctuating elemental image output from each element of said detector means, which image output derives from a high spatial frequency object;

means for sensing fluctuations of the output of said detector means; and means for limiting the wavelength of input radiation to said detector means.

* * * * *